United States Patent [19]
Omi et al.

[11] Patent Number: 4,573,838
[45] Date of Patent: Mar. 4, 1986

[54] HOLE CUTTER

[75] Inventors: Takashi Omi; Shohei Ohmi, both of Anjo, Japan

[73] Assignee: Omi Kogyo Co., Ltd., Anjo, Japan

[21] Appl. No.: 597,145

[22] Filed: Apr. 5, 1984

[51] Int. Cl.$^4$ .............................................. B23B 51/04
[52] U.S. Cl. .................................. 408/204; 408/206; 408/223
[58] Field of Search ............... 408/204, 206, 703, 223, 408/230; 407/60, 61

[56] References Cited

U.S. PATENT DOCUMENTS

| 3,765,789 | 10/1973 | Hougen | 408/204 |
| 3,860,354 | 1/1975 | Hougen | 408/206 |
| 4,400,119 | 8/1983 | Clement | 408/223 |

Primary Examiner—Jimmy C. Peters
Attorney, Agent, or Firm—Jordan and Hamburg

[57] ABSTRACT

A hole cutter having a generally cylindrical cutter body provided around its lower end with a plurality of first cutting teeth each having a plurality of cutting edges, and a plurality of second cutting teeth adapted to scrape a surface cut by the first cutting teeth.

8 Claims, 12 Drawing Figures

HOLE CUTTER

BACKGROUND OF THE INVENTION

This invention relates to a hole cutter having a plurality of cutting teeth provided around the lower end of a generally cylindrical cutter body.

SUMMARY OF THE INVENTION

It is an object of this invention to provide a hole cutter having a high chip ejection efficiency and a high hole cutting efficiency with a reduced cutting resistance.

It is another object of this invention to provide a hole cutter which is very easy to sharpen.

According to this invention, there is provided a hole cutter having a plurality of cutting teeth provided around the lower end of a generally cylindrical cutter body, the cutting teeth comprising a plurality of first cutting teeth each having a plurality of cutting edges and a plurality of second cutting teeth adapted to scrape the surface cut by the first cutting teeth. The first and second cutting teeth are preferably located alternately with each other.

Each of the first cutting teeth has clearance faces defining a clearance angle and cutting angles which are substantially equal to the corresponding angles defined by clearance faces on the second cutting teeth. Each first cutting tooth has a stepped front face defining a plurality of cutting edges, and each second cutting tooth has a smaller number of cutting edges than each first cutting tooth. The first and second cutting teeth have a substantially equal rake angle.

DETAILED DESCRIPTION OF THE INVENTION

Figures 1, 2:
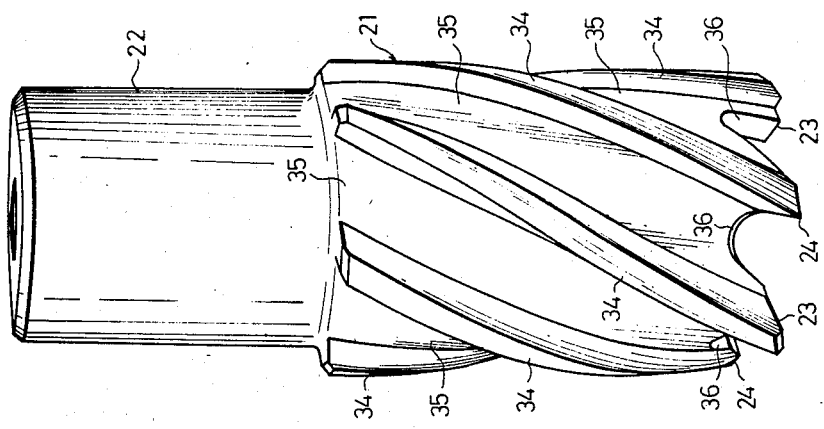
FIG. 1 is a front elevational view of a hole cutter embodying this invention.
FIG. 2 is a fragmentary perspective view showing the arrangement of cutting teeth.
Figure 3:
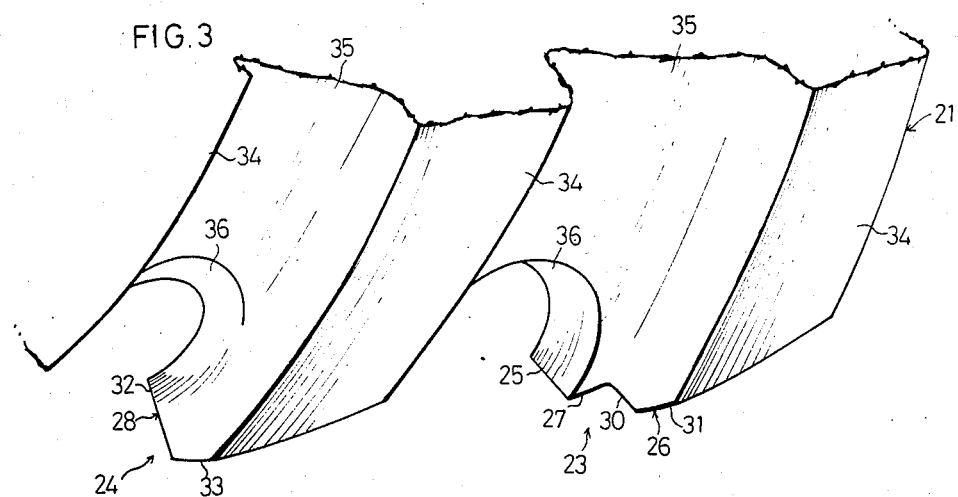
FIG. 3 is a fragmentary enlarged perspective view showing a first cutting tooth and a second cutting tooth.
Figure 4:
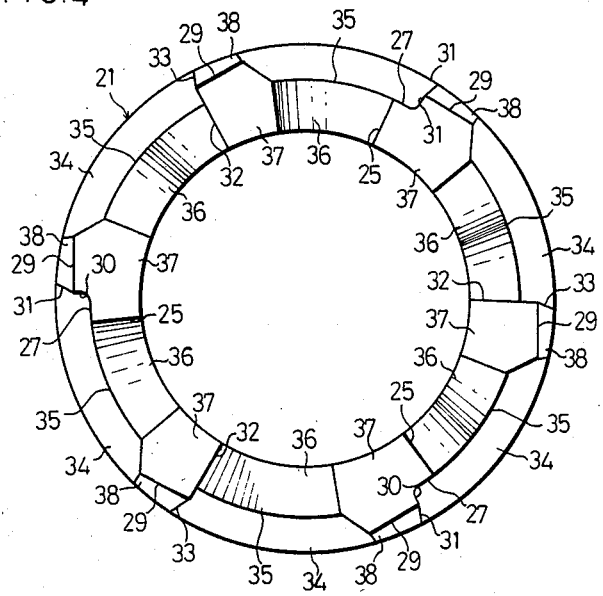
FIG. 4 is a bottom plan view of the hole cutter.

Referring to the drawings, a hole cutter embodying this invention includes a generally cylindrical cutter body 21 provided at its upper end with an upright shank 22 by which the cutter is connected to a rotary shaft not shown. The cutter body 21 is provided around its lower end with a plurality of first cutting teeth 23 and a plurality of second cutting teeth 24 which are located in equally spaced, alternate relation with each other. The bottom surface of each of the cutting teeth 23 and 24 has a crest 29 which divides an inner clearance face 37 from an outer clearance face 38, as shown in FIGS. 2 and 4.

Figures 5, 6:
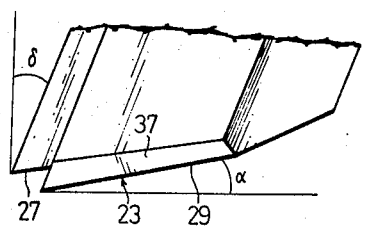
FIG. 5 is a fragmentary side elevational view showing a clearance face on a first cutting tooth.
FIG. 6 is a fragmentary side elevational view showing a clearance face on a second cutting tooth.

The crests 29 of the cutting teeth 23 and 24 define a substantially equal clearance angle $\alpha$, as shown in FIGS. 5 and 6. Accordingly, the clearance faces 37 and 38 of the cutting teeth 23 and 24 also have a substantially equal clearance angle $\alpha$. The crests 29 of the cutting teeth 23 and 24 are located substantially on the circumference of a circle having its center on the longitudinal axis of the cutter.

Each of the first cutting teeth 23 has a stepped front face defining an inner cutting edge 25, an outer cutting edge 26 and a shoulder 27 located therebetween, as shown in FIGS. 2 to 5. The outer cutting edge 26 is divided by the front end of the crest 29 into an inner cutting edge portion 30 and an outer cutting edge portion 31. Each of the second cutting teeth 24 has a cutting edge 28 which is divided by the front end of the crest 29 into an inner cutting edge portion 32 and an outer cutting edge portion 33.

Figure 7:
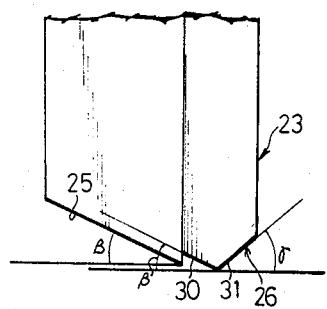
FIG. 7 is a fragmentary front elevational view showing cutting edges on a first cutting tooth.
Figure 8:
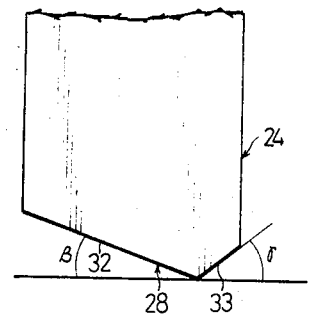
FIG. 8 is a fragmentary front elevational view showing a cutting edge on a second cutting tooth.

The inner clearance faces 37 of the cutting teeth 23 and 24 have an equal cutting angle of $\beta$ to the rotating plane of the hole cutter, and their outer clearance faces 38 also have an equal cutting angle of $\gamma$ thereto. Therefore, the inner cutting edge 25 and inner cutting edge portion 30 of each first cutting tooth 23 and the inner cutting edge portion 32 of each second cutting tooth 24 have an equal cutting angle of $\beta$, and the outer cutting edge portions 31 and 33 of the cutting teeth 23 and 24, respectively, have an equal cutting angle of $\gamma$, as shown in FIGS. 7 and 8. The apexes of the cutting teeth 23 and 24 defined at the front ends of the crests 29 are located substantially on the circumference of a circle having its center on the axis of rotation of the hole cutter. The apexes of the second cutting teeth 24 slightly extend further beyond those of the first cutting teeth 23. The cutting teeth 23 and 24 have an equal rake angle $\delta$, as is obvious from FIGS. 5 and 6.

The cutter body 21 is provided on the outer periphery thereof with a ridge 34 spirally upwardly extending from each of the cutting teeth 23 and 24. Every two adjoining ridges 34 define a flute 35 for chip ejection therebetween. The cutter body 21 is also formed at its lower end with a gullet 36 for chip ejection which is located between every two adjoining cutting teeth 23 and 24.

Figure 9:
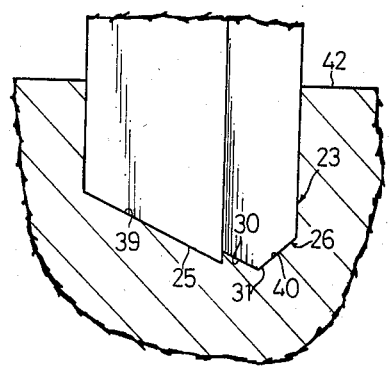
FIGS. 9 to 11 are a series of enlarged sectional views showing a number of cutting teeth in successive use for the cutting operation.
Figure 10:
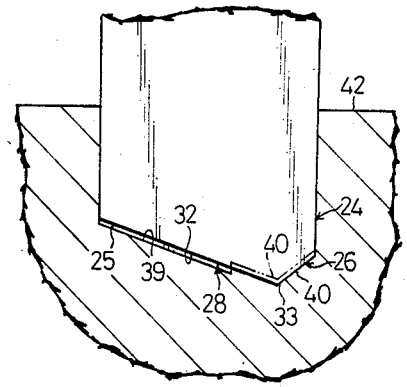
Figure 11:
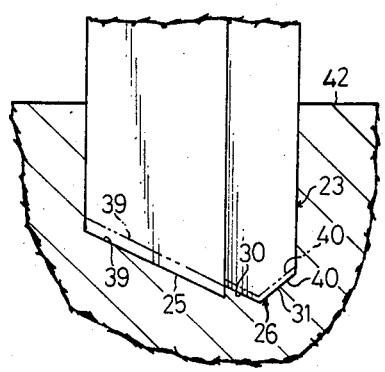
Figure 12:
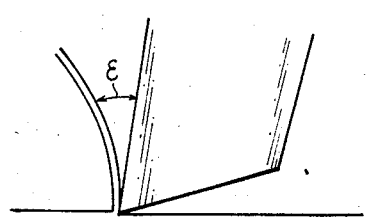
FIG. 12 is a view illustrating a mode of chip ejection.

In operation, each first cutting tooth 23 cuts the material 42 to be cut to form two cut surfaces 39 and 40 by the inner and outer cutting edges 25 and 26, respectively, as shown in FIG. 9. Then, each second cutting tooth 24 cuts only the outer cut surface 40 formed by the outer cutting edge 26 of the first cutting tooth 23, as shown in FIG. 10. This reduces a difference in height between the inner and outer cut surfaces 39 and 40, and the inner and outer cutting edges 25 and 26 of another first cutting tooth 23 cut chips of different thickness. Therefore, the inner and outer chips are of different rigidity, and have different angles $\epsilon$ of ejection, as is obvious from FIG. 12.

If the inner and outer chips were equal in thickness, they would have an equal angle of ejection, and undergo plastic deformation to form a single chip even if the inner and outer cutting edges 25 and 26 were spaced apart from each other circumferentially or vertically. The chip having a greater width would be difficult to eject, and have an adverse effect on the working efficiency of the hole cutter.

The hole cutter of this invention, however, produces only chips which are narrow enough to be easily ejected. The chip cut by the outer cutting edge 26 is so thick and rigid that it is ejected with the chip cut by the inner cutting edge 25 which is thinner and would otherwise be likely to stick to the tooth. Thus, both of the inner and outer chips are easy to eject. The clearance between the inner cutting edge portion 32 of the second cutting tooth 24 and the cut surface 39 is so small, as shown in FIG. 10, that any chip remaining on the cut surface 39 is scraped away by the inner cutting edge portion 32. This ensures satisfactory cutting of the surface 39 by another first cutting tooth 23. Thus, the hole cutter of this invention enables a high chip ejection efficiency and thereby a high cutting efficiency.

The crests 29 of the first and second cutting teeth 23 and 24 are located substantially on the circumference of a single circle, and their clearance faces 37 and 38 define substantially equal clearance angles $\alpha$ and cutting angles $\beta$ and $\gamma$, as hereinbefore stated. This means that the clearance faces 37 and 38 of the cutting teeth 23 and 24 face substantially in the same direction, and render their sharpening very easy.

Although the invention has been described with reference to a preferred embodiment thereof, it is, of course, a mere example thereof, and the invention may be embodied in various other modes as will hereinafter be set forth by way of example. (1) A plurality of cutter tips each having the first or second cutting teeth, may be separately formed from the cutter body and be secured by brazing or otherwise to the lower end of the cutter body.

(2) It is possible to locate the first cutting teeth 23 in pairs and dispose a second cutting tooth 24 between every two adjoining pairs of first cutting teeth 23, instead of positioning the first and second cutting teeth exactly alternately with each other as shown in the drawings. In this case, however, it is desirable to dispose teeth of the same type at the diametrically opposite positions of the cutter.

(3) The cutting teeth may be of the type free from any crest and, therefore, having only a single clearance face.

What is claimed is:

1. A hole cutter, comprising:
    a generally cylindrical cutter body adapted to be rotated by power means and having an end portion, and
    a plurality of first and second cutting teeth connected to and situated circularly around the end portion of the cutter body, said first and second cutting teeth being mutually interspersed around the end portion of the cutter body,
    each first cutting tooth including at least one first cutting surface having a predetermined clearance angle and a cutting angle relative to the horizontal plane perpendicular to the central axis of the cutter body, said clearance angle extending rearwardly relative to the rotational direction of the cutter body and the cutting angle extending radially of the cutter body, and first and second cutting edges situated at a front end of the first cutting surface, said second cutting edge being situated radially outwardly and circumferentially rearwardly away from the first cutting edge relative to the cutter body so that the first and second cutting edges form stepped edges and the second cutting edge is located from the cutter body more remotely than the first cutting edge,
    each second cutting tooth including at least one second cutting surface having the same clearance angle and cutting angle as those of the first cutting tooth, and a third cutting edge situated at a front edge of the second cutting surface of the second cutting tooth, said third cutting edge being located in the axial direction of the cutter body between the first and second cutting edges so that when the hole cutter is operated, the first, second and third cutting edges cut chips of different thickness to facilitate ejection of the chips from the hole cutter.

2. A hole cutter according to claim 1, in which said first cutting surface of the first cutting tooth includes a first inner cutting surface facing radially inwardly of the cutter body, a first outer cutting surface facing radially outwardly of the cutter body, and a first crest dividing the first inner and outer cutting surfaces, said first crest substantially perpendicularly intersecting the second cutting edge so that the second cutting edge cuts a V-shape groove.

3. A hole cutter according to claim 2, in which said cutting angle includes an inner cutting angle between the first inner cutting surface and the horizontal plane, and an outer cutting angle between the first outer cutting surface and the horizontal plane.

4. A hole cutter according to claim 3, in which said second cutting surface of the second cutting tooth includes a second inner cutting surface facing radially inwardly of the cutter body and having the same inner cutting angle as the first cutting tooth, a second outer cutting surface facing radially outwardly of the cutter body and having the same outer cutting angle as the first cutting tooth, and a second crest dividing the second inner and outer cutting surfaces, said second crest being equidistantly located from the central axis of the cutter body as the first crest.

5. A hole cutter according to claim 4, in which said first and second cutting edges of the first cutting tooth include the same rake angle relative to the radial plane of the cutter body, and the third cutting edge of the second cutting tooth includes a rake angle relative to the radial plane of the cutter body, the rake angle of the first and second cutting edges being the same as that of the third cutting edge.

6. A hole cutter according to claim 5, in which said first and second cutting teeth are alternately situated around the end portion of the cutter body.

7. A hole cutter according to claim 6, in which said cutter body includes a plurality of gullets between the two adjacent cutting teeth for ejecting chips therebetween.

8. A hole cutter according to claim 7, in which said cutter body further includes a plurality of ridges on an outer surface thereof, said ridges extending spirally rearwardly relative to the rotational direction of the cutter body and extending upwardly from the cutting teeth, two adjacent ridges forming therebetween a flute for ejecting chips.

* * * * *